Nov. 20, 1923

L. A. STEGMANN

DISPLAY DEVICE

Filed Oct. 11, 1921

1,474,388

4 Sheets-Sheet 1

INVENTOR
Louis A. Stegmann,
BY
Wm. H. Canfield
ATTORNEY

Nov. 20, 1923

L. A. STEGMANN

DISPLAY DEVICE

Filed Oct. 11, 1921

1,474,388

4 Sheets-Sheet 2

INVENTOR
Louis A. Stegmann,
BY
Wm H Campbell
ATTORNEY

Nov. 20, 1923.
L. A. STEGMANN
DISPLAY DEVICE
Filed Oct. 11, 1921
1,474,388
4 Sheets-Sheet 3
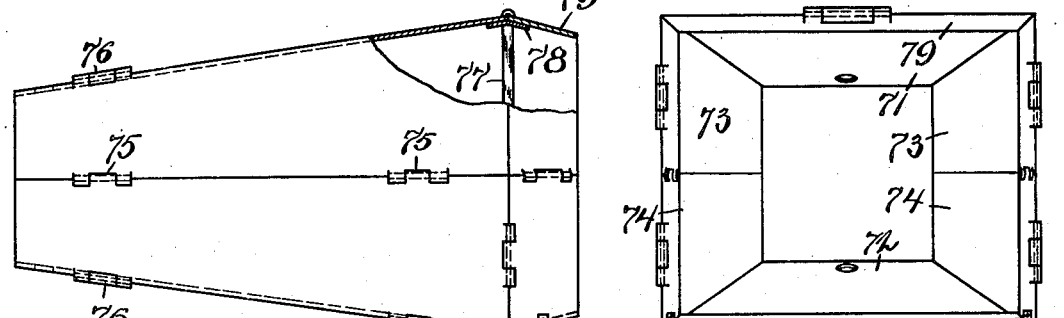
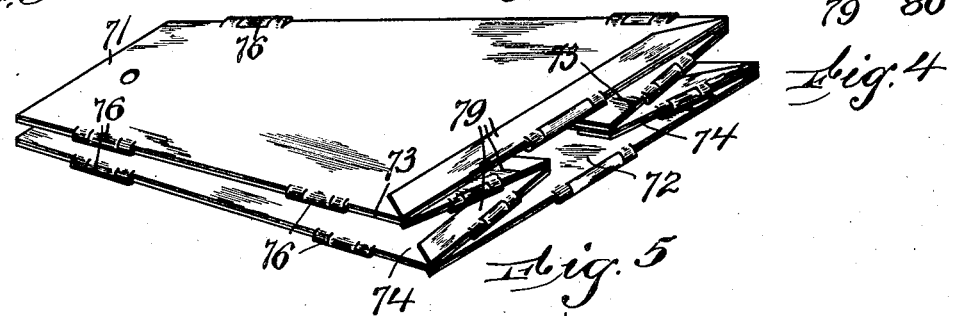
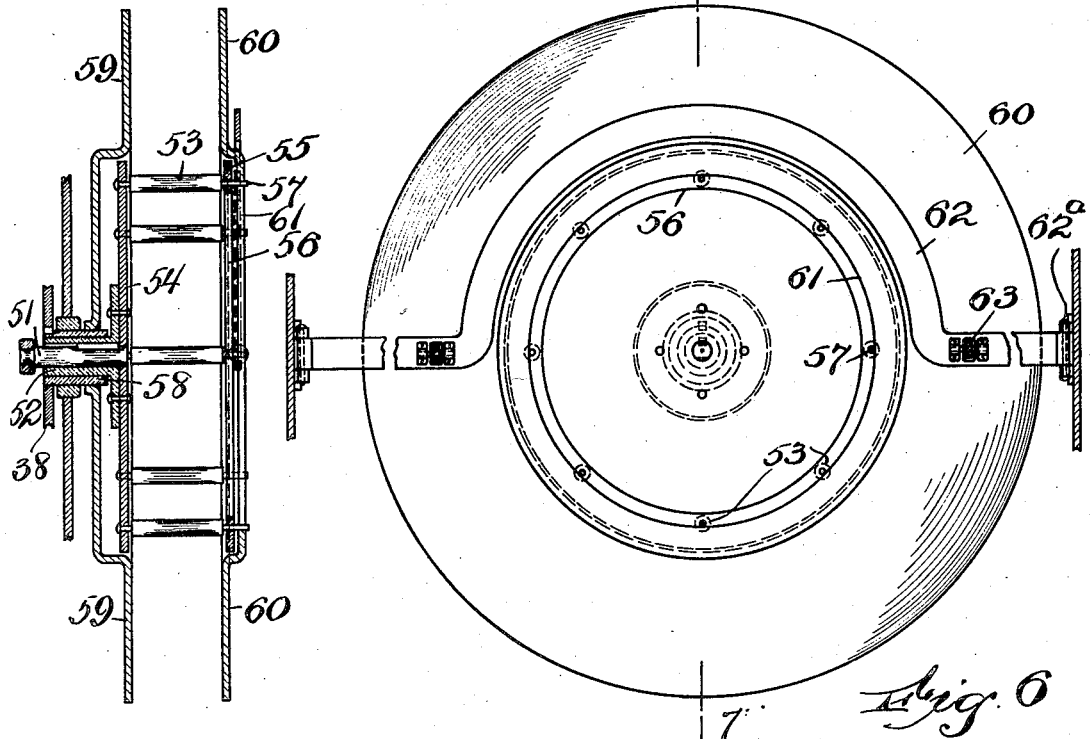
INVENTOR
Louis A. Stegmann,
BY
Wm. H. Campfield
ATTORNEY Nov. 20, 1923

L. A. STEGMANN

DISPLAY DEVICE

Filed Oct. 11, 1921 4 Sheets-Sheet-4

1,474,388

INVENTOR
Louis A. Stegmann,
BY
Wm H. Caufield,
ATTORNEY.

Patented Nov. 20, 1923.

1,474,388

UNITED STATES PATENT OFFICE.

LOUIS A. STEGMANN, OF NEWARK, NEW JERSEY, ASSIGNOR TO CINEMA ADVERTISING CORPORATION, OF NEWARK, NEW JERSEY.

DISPLAY DEVICE.

Application filed October 11, 1921. Serial No. 507,106.

*To all whom it may concern:*

Be it known that I, LOUIS A. STEGMANN, a citizen of the United States, and a resident of Newark, county of Essex, and State of New Jersey, have invented certain new and useful Improvements in Display Devices, of which the following is a specification.

This invention relates to a display device which is particularly adapted for advertising, but which can be used in any location where a small portable projection apparatus is desired, the device comprising a cabinet in which the film-actuating mechanism is mounted and in which a source of light is placed, said light being adapted to project images from the film on a screen, said screen being supported by the apparatus.

The invention also comprises a hood in which the screen is mounted, the hood being foldable and being adapted to be placed with the screen inside the cabinet for transportation and being made so as to be easily folded or extended, and when extended acting as a support for the screen.

The invention further consists in certain details of construction to be hereinafter more fully described and finally embodied in the claims.

Figure 1:
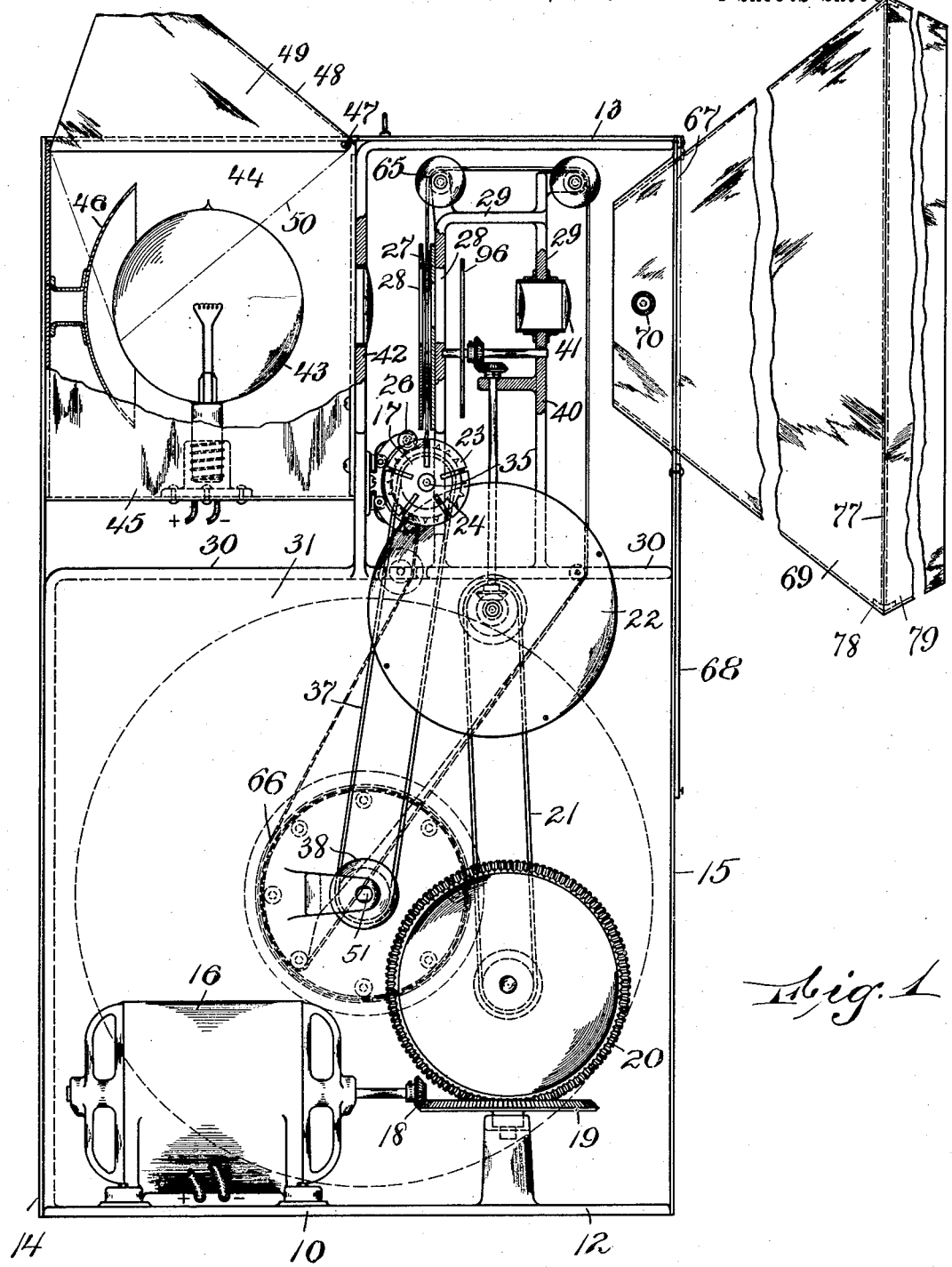
Figure 2:
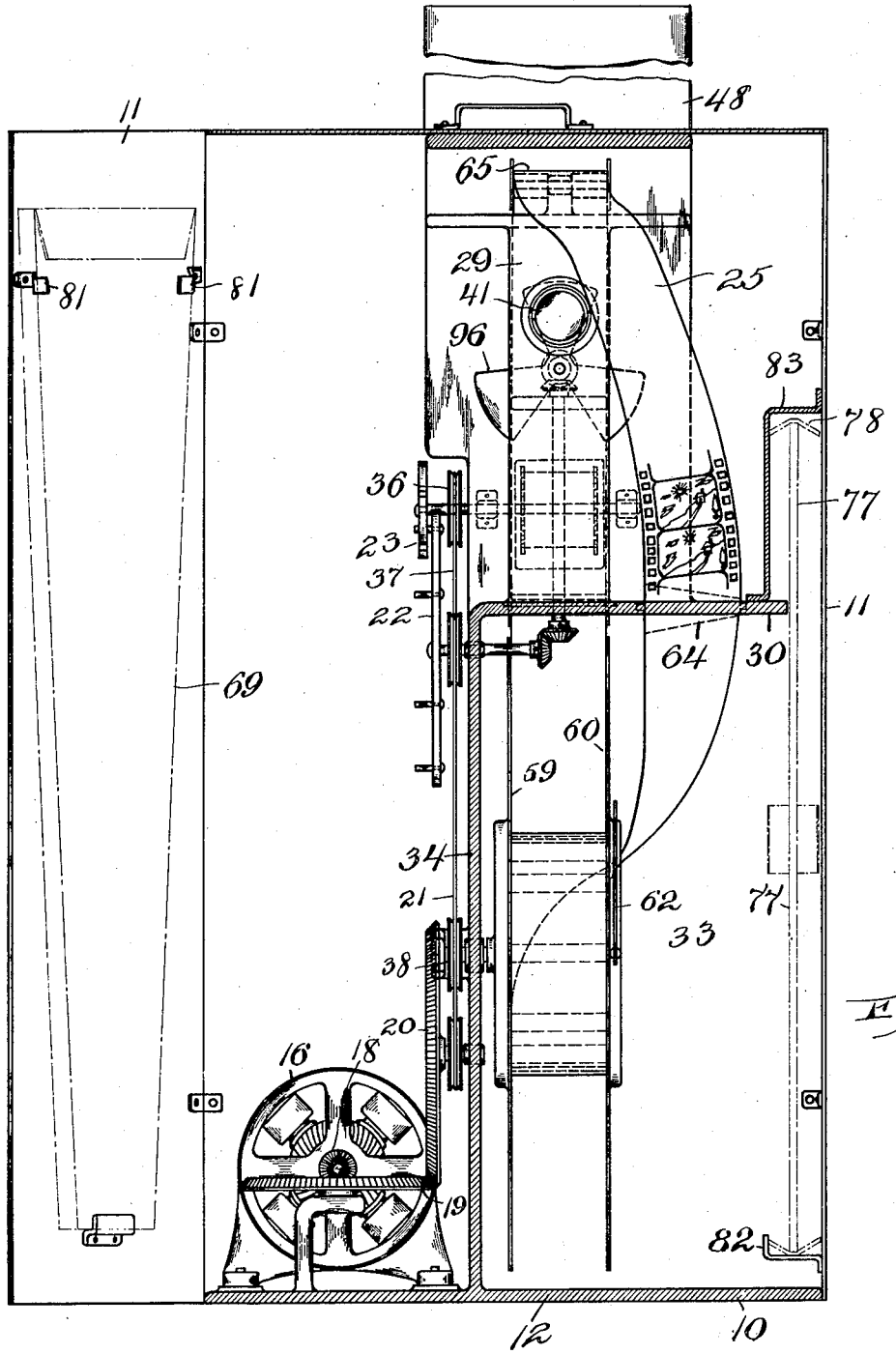
Figures 8, 9:
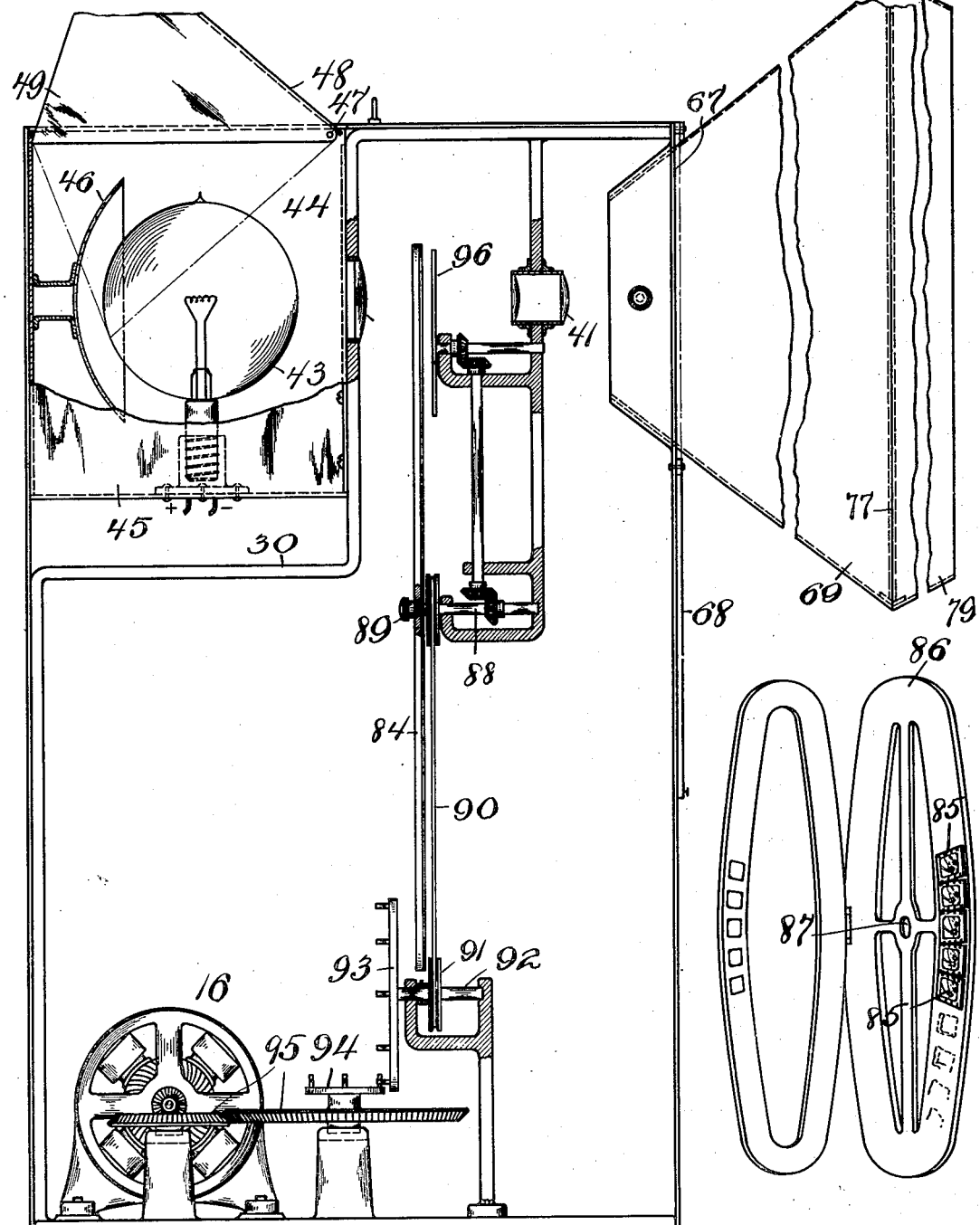

The invention is illustrated in the accompanying drawings, in which Figure 1 is a side view of the machine, showing one side removed, some of the parts being illustrated in section to more clearly illustrate their construction. Figure 2 is a front view with the front side of the cabinet removed and with a part of the standard being shown in section. Figure 3 is a side view of the hood of the device. Figure 4 is a front view of the hood shown in Figure 3. Figure 5 is a perspective of the hood partly folded. Figure 6 is a side view of a spool used in the device, and on which spool the film is mounted. Figure 7 is a vertical section taken on line 7—7 in Figure 6. Figure 8 is a side view similar to Figure 1, showing a modified form of construction, and Figure 9 is a perspective view of a film displaying device and showing a modification of the film feeding device shown in Figures 1 and 2.

I employ a cabinet 10 which is preferably entirely enclosed, the sides 11 of which are preferably made as doors so that they can be swung outwardly to give easy access to the mechanism within the cabinet, the cabinet having a bottom 12, on which the mechanism for the most part rests, and having a top 13, a back 14 and a front 15. The casing contains the mechanism for advancing and illuminating the film and also preferably contains the motive power comprising an electric motor 16, usually mounted on the base or bottom 12 and connected to a suitable step-by-step mechanism 17, the form of connection shown including a set of bevel gears 18, 19 and 20, the gear 20 being connected by a pulley 21 with the pin-wheel 22 of the star wheel 23, so that the star wheel has an intermittent or step-by-step motion, whereby the roller 24, which is rotated by the star wheel, moves the film 25 which is held normally in engagement with the roller 24 by suitable presser rollers 26.

The film 25 passes between the guide plates 27, in which the openings 28 are provided for the passage of light, the guide plates 27 being mounted on a frame 29 which rests on the platform or table 30 which forms the top of a box-like frame 31, as will be seen from Figures 1 and 2, so as to provide the chamber 33 in which the film spool is mounted. One wall 34 of this frame 31 provides bearings for the shafts of the gears 20 and the pin-wheel 22. The star wheel 23 and the roller 24 are mounted on a shaft 35, on which is also mounted a pulley 36 which is connected by a belt 37 to a pulley 38 which is on a sleeve 58 of the film spool.

The frame 29 also includes the portion 40 for supporting the lens 41 substantially in line with the openings 28, and a plate 42, which extends up from the box-like frame 31, has an opening also in line with the openings 28 and is adapted to receive rays from a suitable bulb 43 in the chamber 44 within the substantially closed casing 45. A suitable reflector 46 projects the rays from the source of light, as the bulb 43, forward to the film.

The top of the chamber 44 is open, and hinged at one end, as at 47, is a cover 48 which has side plates 49 thereon so that the cover can be raised, as shown in full lines in Figures 1 and 2, so as to permit the escape of heat from the bulb, and is adapted to be folded down, as shown in dotted outline at 50 in Figure 1, so that when the device is in use a flat top is presented.

The film 25 is a continuous film, that is, it is an endless film that is fed to and from the same spool, said spool mechanism being shown in general in Figures 1 and 2, and in detail in Figures 6 and 7. A stationary post or shaft 51 is mounted so as to be non-rotatable in the bearing 52, and on this post 51 is arranged a set of rollers 53 mounted between the inner side plate 54 and the outer side plate 55, the outer side plate having a central opening 56 which is substantially concentric to the set of rollers 53, these rollers being disposed in a circle and having projecting pintles 57. Encircling the post 51 is a rotatable sleeve 58, to which one of the side plates 59 of the spool is secured, the sleeve 58 also being secured to the pulley 38, which pulley is shown in Figures 1 and 2, and an outer side plate 60 cooperates with the side plate 59 to hold the roll or reel of film in alignment on the series of rollers 53, the outer plate 60 having an opening 61 concentric with the opening 56 and through which the film can pass. The outer side plate 60 of the spool is held in place against any radial movement by reason of the opening 61 bearing on the pintles 57, and against any lateral movement by reason of the curved arm 62 which arches over the openings 56 and 61 and is detachably secured at its ends, as at 63, so that it can be swung from either end to permit the removal of the plate 60, or can be locked in position so that suitable anti-friction devices, such as the rollers 63, bear against the outer face of the side plate 60.

The reel, when the machine is in operation, is rotated, that is, the parts 59 and 60 are rotated, and the film is taken from the center of the reel, passes over one of the rollers 53 and out through the openings 56 and 61, which are substantially aligned, as will be evident from Figure 2, then up over a roller 64 (Fig. 2), which roller is mounted in an opening in the table portion 30, which, it will be noticed, is laterally disposed relative to the spool, and then over the roller 65 in the upper part of the frame 29, then down through the guide plates 27, and after passing over the roller 24 is again wound on the outside of the reel 66, as will be seen from Figure 1.

In the front side of the casing is an opening 67 which is normally closed by a slide 68, shown in Figure 1, and a hood is placed within this opening when the opening is open so as to permit the holding of a screen at a material distance from the lens, this hood 69 being detachably secured by thumb screws 70. The hood itself is shown in detail in Figures 3, 4 and 5, and is preferably square in cross-section, the sides being divergent, and two of the opposed sides, as 71 and 72, can be folded toward each other, since the two other of the opposed sides are each made of two members 73 and 74, being hinged longitudinally, as at 75, and these opposed sides in turn being hinged together, as at 76, so that the separable or foldable sides can be folded inward between the two other of the opposed sides, as shown in Figure 5.

A screen 77 is held at the outer end of the hood, and for this purpose I prefer to make the edges of the screen 77 slightly bulged, as at 78, and extensions 79 at the front ends of the hood proper are folded until they converge, and in this way bear on the rim or marginal flange 78 of the screen and hold it in position. The extensions 79 of the foldable sides of the hood are preferably hinged together so as to be foldable with the side edges that fold inward, as shown in Figure 5, the other of said extensions 79 being hinged to the sides of the hood proper so that they can be folded back when the hood is folded.

Normally, when the hood is extended and the screen 77 is in position, catches 80 (Fig. 4) are used for holding these extensions 79 in normal position.

When the machine is to be transported, or for any purpose is to be assembled, the folded hood is held within the casing, the casing having means for this purpose, and in the drawings I show means consisting of catches 81 on the door 11, into which the folded hood can be placed, the folded hood being shown in dotted outline, and on the opposite door I may arrange means for holding the screen 77, which is also shown in dotted outline, held on a bracket 82, and at the top edge being held by the extension or plate 83 of the table portion 30 of the frame.

In Figures 8 and 9 I show a modified form of machine in which the continuous reel is replaced by a disk 84 which is shown in detail in Figure 9, and is composed of two hinged members which are folded together to retain the films 85, or rather pictures taken from the films, and arranged in proper sequence around the rim 86 of the disk 85. The disk is provided with an opening 87 by means of which it is fastened to a jack-shaft 88, as by means of the thumb screw 89, the jack-shaft being operated by a belt 90 from a pulley 91 on the shaft 92, on which shaft 92 is also arranged the pin-wheel 93 operated by a similar wheel 94 driven by means of gearing 95 from the motor 16. The shutter 96 is operated by means of suitable gearing on the shaft 88, as will be evident from Figures 1 and 8.

I claim:

1. A portable display device comprising a cabinet, a folding hood adapted for attachment to the outside of the cabinet, a translucent screen having means for attachment in the hood when the hood is extended, means on the cabinet for holding the hood when folded, and means on the cabinet for securing the screen when detached from the hood.

2. A portable display device comprising a cabinet, a hood detachably arranged on the front of the cabinet, a rigid transluent screen adapted to be secured in the cabinet, the hood having divergent sides, two of said opposed sides being formed of two members hinged together longitudinally and adapted to be folded within the other of the opposed sides.

3. A portable display device comprising a cabinet, a hood detachably secured to the cabinet, the cabinet having an opening in front of which the hood is adapted to be secured, inwardly inclined extensions on the sides of the hood, two of the opposed sides of the hood being hinged longitudinally so as to fold inwardly between the other of the opposed sides of the hood, the extensions of said foldable sides being similarly hinged, a screen adapted to fit in where the extension and the sides of the hood join, means in the cabinet for holding the hood when it is folded, and means in the cabinet for supporting the screen.

4. A portable display device comprising a cabinet having an opening therein, a hood adapted to be secured in the opening and projecting therefrom, converging extensions on the hood, the sides of the hood proper being divergent and the extensions being slightly inwardly inclined in their normal position, means for detachably securing the extension of the hood in normal position, a translucent screen adapted to be secured at the juncture of the hood and its extension, opposed sides of the extension of the hood being hinged longitudinally so as to fold inwardly between the other of the opposed sides of the hood, and the extensions of said other of said opposed sides being hinged thereto to be folded back thereon.

5. A portable display device comprising a cabinet having an opening therein, a hood adapted to be secured in the opening and projecting therefrom, converging extensions on the hood, the sides of the hood proper being divergent and the extensions being slightly inwardly inclined in their normal position, means for detachably securing the extension of the hood in normal position, a translucent screen adapted to be secured at the juncture of the hood and its extension, opposed sides of the extension of the hood being hinged longitudinally so as to fold inwardly between the other of the opposed sides of the hood, and the extensions of said other of said opposed sides being hinged thereto to be folded back thereon, means within the cabinet for holding the hood when folded, and means within the cabinet for holding the screen.

In testimony that I claim the foregoing, I have hereto set my hand, this 10th day of October, 1921.

LOUIS A. STEGMANN.